W. A. HARRIS.
AUTOMATIC PUMP.
APPLICATION FILED APR. 22, 1912.
1,053,032.
Patented Feb. 11, 1913.
3 SHEETS—SHEET 3.
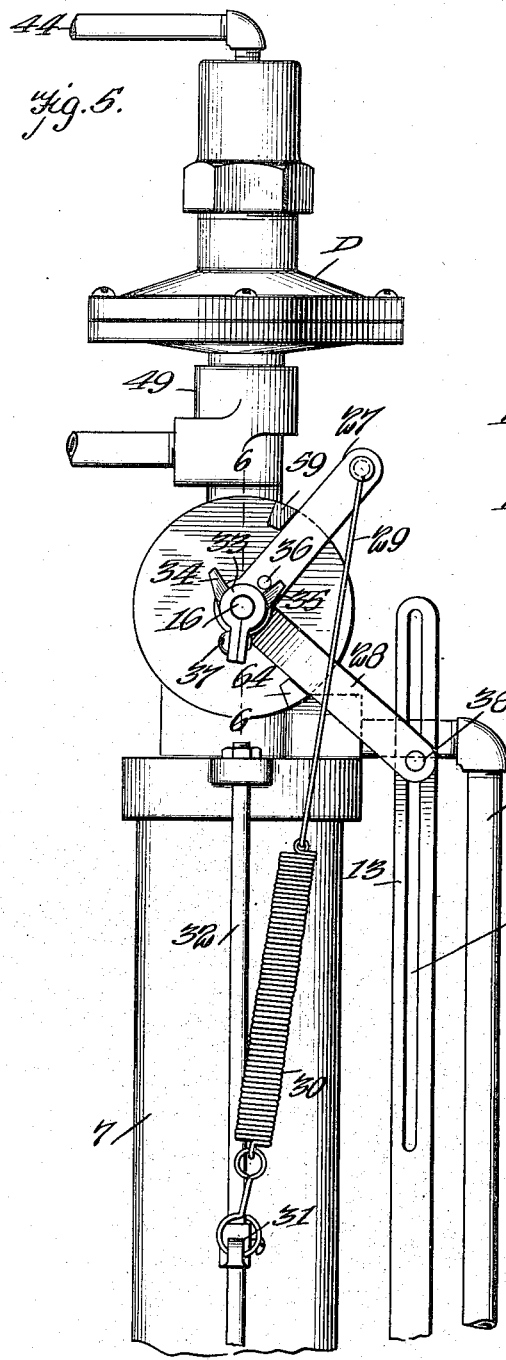
WITNESSES
E. M. Callaghan
L. A. Stanley
INVENTOR
WILLIAM A. HARRIS,
BY Munn & Co.
ATTORNEYS

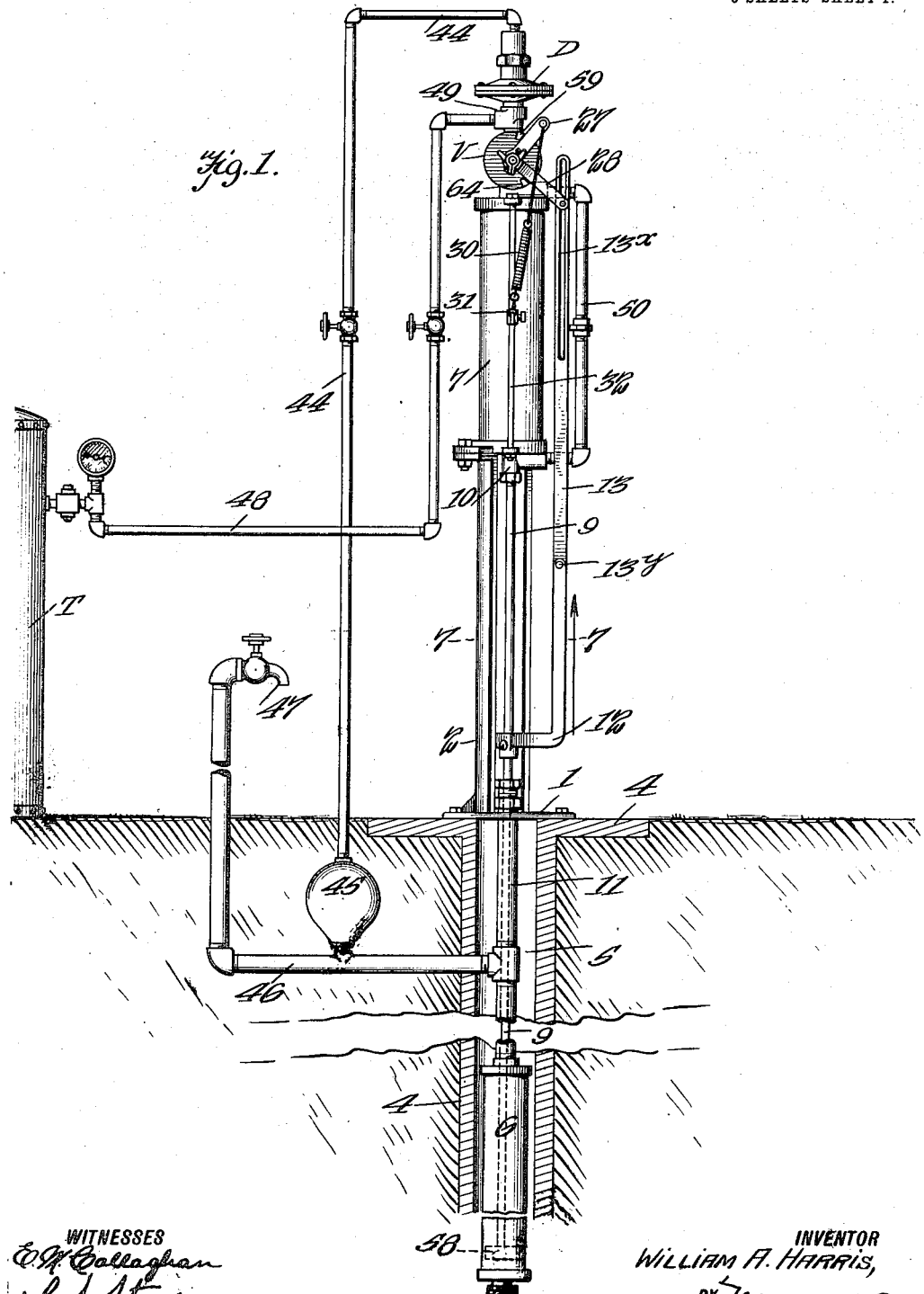

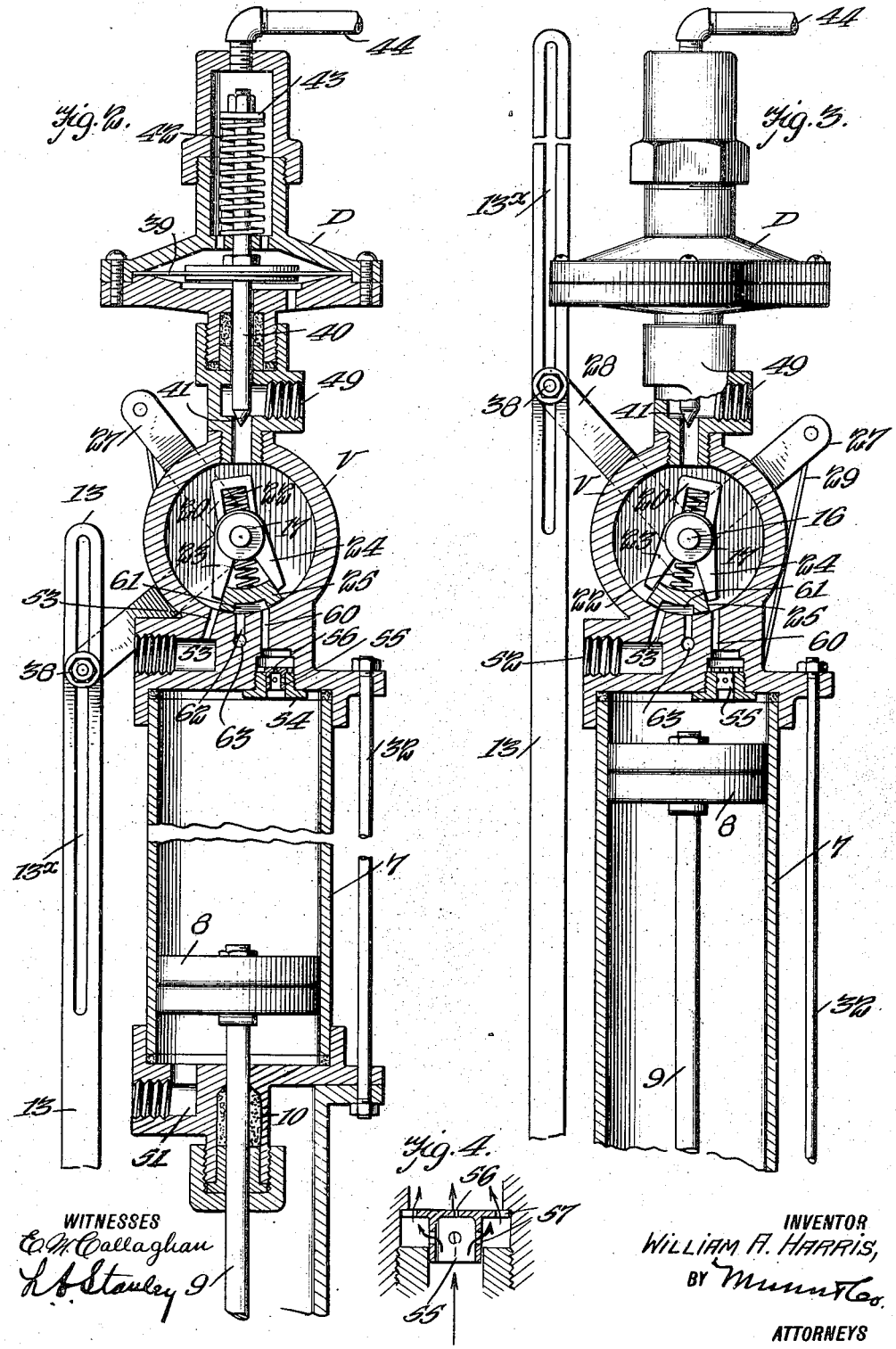

UNITED STATES PATENT OFFICE.

WILLIAM A. HARRIS, OF GREENVILLE, SOUTH CAROLINA.

AUTOMATIC PUMP.

1,053,032.

Specification of Letters Patent.

Patented Feb. 11, 1913.

Application filed April 22, 1912. Serial No. 692,408.

*To all whom it may concern:*

Be it known that I, WILLIAM A. HARRIS, a citizen of the United States, and a resident of Greenville, in the county of Greenville and State of South Carolina, have made certain new and useful Improvements in Automatic Pumps, of which the following is a specification.

My invention relates to improvements in automatic pumps, especially those that are designed to be operated by compressed air, and it consists in the combinations, constructions, and arrangements herein described and claimed.

An object of my invention is to provide a pump for elevating water which will operate continuously while water is being drawn from a faucet or other outlet, but which will automatically stop after the faucet is closed.

A further object of my invention is to provide an automatic pump for operating under compressed air or other fluid media, which is of relatively simple construction, and which will not easily get out of order.

A further object of my invention is to provide an improved form of valve for controlling the compressed air.

A further object of my invention is to provide a pump of great efficiency, owing to the fact that provision is made for checking the flow of air when the operating piston is moving the pump piston downwardly.

Other objects and advantages will appear in the following specification and the novel features of the device will be particularly pointed out in the appended claims.

My invention is illustrated in the accompanying drawings forming part of this application in which—

Figure 1 is a side view of the device, Fig. 2 is a vertical sectional view through the air cylinder, valve and diaphragm, showing the valve in one position, Fig. 3 is a sectional view showing the valve in another position, Fig. 4 is a detail sectional view of the check valve, Fig. 5 is a side view of the upper portion of the apparatus, Fig. 6 is a detail section along the line 6—6 of Fig. 5, and Fig. 7 is an enlarged sectional view along the line 7—7 of Fig. 1.

In carrying out my invention I provide a base 1, upon which is a standard 2 which has a guide slot 3 (see Fig. 7). The base is designed to rest upon the top 4 of a well 5 in which the pump cylinder 6 is disposed. At the top of the standard 2 is secured the air cylinder 7. The latter is provided with a piston 8 whose piston rod 9 passes through a stuffing gland 10 in the bottom of the cylinder, thence downwardly into the pipe 11 which communicates with the pump cylinder 6. Secured to the piston rod 9 is an arm 12 which is bent upwardly, and to whose upper end is pivotally connected a rod 13 having a slot $13^x$. Above the cylinder 7 is a valve casing V containing the valve which controls the supply of air to the cylinder 7.

The valve casing V consists of two parts, a body portion 14 and a cap 15, arranged to screw into the portion 14, as shown in Fig. 6. The portion 14 has an integral extension $14^x$ on one side thereof and an integral sleeve $14^y$ carried by the portion $14^x$ (see Fig. 6). One end of a shaft 16 is carried by the sleeve $14^y$, the opposite end of the shaft 16 being carried in a recess $15^x$ in the cap 15. Carried by the shaft 16 and integral with it is a hub 17, which fits in a recess 18. A washer 19 is disposed between the hub and the casing 14, as shown in Fig. 6. The hub 17 bears an integral yoke 20, and is provided with a cylindrical bore 21 arranged to receive a spring 22, which passes through the hub and engages the end of the yoke, as shown in Figs. 2, 3 and 6. On the opposite side of the hub from the yoke 20 are a pair of arms 23 and 24, which are integral with the hub. The ends of these arms straddle a slide valve 25, which is pressed by the spring 22 against the inner face of the valve casing.

Loosely disposed on the sleeve $14^y$ is a collar 26, which bears an arm 27 at its outer end and an arm 28 on its inner end at right angles to the arm 27. The arm 27 is pivotally connected by means of the pin $27^x$ and link 29 with a spring 30, whose lower end is secured to an adjustable collar 31 carried by a rod 32 disposed between the ends of the cylinder 7 (see Figs. 1, 2 and 3). At the end of the shaft 16 is a split collar 33 having integral lugs 34 and 35 arranged to be engaged by a pin 36 on the arm 27. The collar may be clamped to the shaft by means of the set screw 37. The arm 28 is provided with a pin 38, which passes through the slot $13^x$ of the rod or link 13.

Disposed above the valve casing V is a diaphragm casing D, which contains a diaphragm 39. On the lower side of the diaphragm is a valve rod 40 whose end 41 constitutes a cut-off valve. Above the diaphragm is a spring 42, which bears on a tension nut 43 on the rod, and which can be adjusted to vary the tension of the spring 42 which determines the pressure required to open the valve 41. The diaphragm casing communicates by means of the pipe 44 with an air chamber 45. The latter connects with the pipe 46, which has communication with the pipe 11, leading to the pump cylinder. The pipe 46 may bear one or more faucets 47, which may be located in any convenient position as in the bath room or kitchen of a building or in any place where water is needed.

The compressed air tank is shown at T and may be of any suitable type. It is connected by means of the pipe 48 with the inlet 49 between the diaphragm casing D and the valve casing V. A pipe 50 establishes communication with a passage 51 at the lower end of the air cylinder 7 and a passage 52 at the upper end. The latter communicates with the interior of the valve casing by means of the passage 53.

At the upper end of the cylinder 7 is a screw plug 54 bearing a check valve 55. This has a small opening 56 at its center, and is provided with openings 57 through which air may pass when the valve is in its raised position, as shown in Fig. 4. When, however, the valve is in its seated position, as shown in Fig. 3 the air can only pass through the central opening 56.

From the foregoing description of the various parts of the device the operation thereof may be readily understood. The air is supplied by means of the tank T or in any suitable manner. Let us assume that the piston 8 is in the position shown in Fig. 2. The air would pass by the pipe 48, through the inlet 49, thence into the interior of the valve casing, and by means of the passages 53 and 52 and the pipe 50 through the passage 51 and on the under side of the piston 8. The latter will therefore be forced upwardly drawing with it the pump piston 58. As the piston rises the air forces the check valve 55 open, and passes by means of the passage 60, the recess 61 in the valve 25, and the passage 62 into the exhaust 63. As the piston 8 rises the arm 13 rises with it until the end of the slot 13ˣ reaches the pin 38 on the arm 28, when the latter will be carried upwardly, the rod 13 swinging outwardly on its pivot 13ʸ. The movement of the arm 27, which, as explained is attached to the same collar as the arm 28, causes the spring 30 to stretch. As soon as the arm 27 gets beyond the vertical line through the axis of the shaft 16 (see Figs. 1 and 5) it will suddenly be thrown over in the direction in which it is rotating. Thus both arms and the collar receive a considerable momentum before the pin 36 engages the lug 34. As soon as this happens the shaft 16 is suddenly rotated, and with it the arms 23 and 24. The valve 25 is therefore shifted very quickly from the position shown in Fig. 2 to that shown in Fig. 3. The movement of the valve continues until the arm 28 strikes a stop 59 (see Figs. 1 and 5). The throw of the valve is such as to bring it into the position shown in Fig. 3. The air now passes from the interior of the valve casing through the passage 60, and by means of the small opening 56 in the valve 55 into the top of the cylinder 7. It will be observed that the closing of the check valve, which has only a small opening in it will not permit much air to pass into the upper part of the cylinder, but it will permit a sufficient quantity to overcome the friction of the piston in the air cylinder, and that of the pump piston 58, so that the two are driven downwardly. When the upper end of the slot 13ˣ engages the pin 38 the arm 28 is shifted in the opposite direction. The spring 30 is stretched as before and the contraction of this spring suddenly shifts the valve 25 into its original position, shown in Fig. 2, in the same manner as that already described. The movement of the arm 28 is limited by means of the stop 64 carried by the valve casing (see Figs. 1 and 5). As the water is lifted the air in the air chamber 45 and the pipe 44 is compressed, and when a predetermined pressure is reached the diaphragm 39 is forced downwardly against the tension of the spring 42, thereby closing the valve 41, and shutting off the supply of air. The pump will then stop. If now water is drawn at the faucet 47, the pressure in the air chamber 45 is relieved, the diaphragm resumes its original position under action of the spring 42, the valve 41 is opened, and the compressed air now enters the valve casing V, thus automatically starting the device.

It will be seen that the mere opening of the faucet and the drawing of the water will cause the pump to operate automatically, and to stop automatically when the pressure is sufficient to operate the diaphragm.

I claim:—

1. In an automatic pumping device, a valve comprising a casing, a shaft extending through said casing, a pair of arms integral with said shaft and disposed within said casing, a valve arranged to be engaged by said arms, a spring for holding said valve against the face of the casing, means for causing the sudden throw of the valve shaft, said means comprising a collar loosely disposed on the valve casing, a pair of arms carried by the collar, means for rotating one of said arms, the other of said arms being under spring tension and being provided with a pin, a split collar secured to said valve shaft, and arms carried by said collar for engagement by said pin.

2. In an automatic pumping device, a cylinder provided with an inlet for motive fluid at each end of the cylinder a main valve for controlling the passage of the motive fluid through said inlets, and auxiliary means for permitting a larger quantity of motive fluid to enter through one inlet in a given time than through the other, said means comprising a valve disposed in one of said inlets and arranged to partially close during the entrance of the motive fluid into the cylinder.

3. In an automatic pumping device, a cylinder provided with an inlet for motive fluid at each end of the cylinder, a main valve for controlling the passage of the motive fluid through said inlets, each of said inlets serving as an outlet when motive fluid is passing through the other inlet, and auxiliary means for permitting a larger quantity of motive fluid to enter through one inlet in a given time than through the other, said means comprising a valve disposed in one of said inlets and arranged to partially close said inlet when the motive fluid is entering through the inlet and to open when the motive fluid is passing out of said inlet.

4. In an automatic pumping device, a valve comprising a casing, a shaft extending through said casing and being provided with a hub having a recess, a pair of arms integral with said hub and disposed within said casing, a valve arranged to be engaged by said arms, a spring disposed between said arms for holding said valve against the face of the casing, one end of said spring being disposed in the recess in said hub, means for causing the sudden throw of the valve shaft, said means comprising a collar loosely disposed on the valve casing, a pair of arms carried by the collar, means for rotating one of said arms, the other of said arms being under spring tension and being provided with a pin, a split collar secured to said valve shaft, and arms carried by said collar for engagement by said pin.

WILLIAM A. HARRIS.

Witnesses:
L. A. STANLEY,
SOLON C. KEMON.